United States Patent
Dinulovic et al.

(10) Patent No.: US 9,973,046 B2
(45) Date of Patent: May 15, 2018

(54) COMMUNICATION DEVICE

(71) Applicant: Würth Elektronik eiSos GmbH & Co. KG, Waldenburg (DE)

(72) Inventors: Dragan Dinulovic, München (DE); Alexander Gerfer, Odenthal (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 0 days. days.

(21) Appl. No.: 14/783,973

(22) PCT Filed: Apr. 14, 2014

(86) PCT No.: PCT/EP2014/057517
§ 371 (c)(1),
(2) Date: Oct. 12, 2015

(87) PCT Pub. No.: WO2014/170265
PCT Pub. Date: Oct. 23, 2014

(65) Prior Publication Data
US 2016/0072365 A1    Mar. 10, 2016

(30) Foreign Application Priority Data

Apr. 17, 2013   (DE) .......... 10 2013 206 955

(51) Int. Cl.
*H02K 11/00*    (2016.01)
*H02K 1/26*    (2006.01)
(Continued)

(52) U.S. Cl.
CPC ............... *H02K 1/27* (2013.01); *H02K 1/26* (2013.01); *H02K 7/1853* (2013.01);
(Continued)

(58) Field of Classification Search
CPC . H02K 1/27; H02K 1/26; H02K 11/01; H02K 11/30; H02K 7/1853; H02K 7/025; H02K 11/00; H02K 11/06; H02K 11/12; H02K 11/18; H02K 1/265; H02K 3/00; H02K 5/00; H02K 7/18; H02K 7/1846; H02K 11/0094; H02K 11/35; H02K 15/00; H02K 2205/00; H04W 52/0296
(Continued)

(56) References Cited

U.S. PATENT DOCUMENTS 5,844,516 A * 12/1998 Viljanen ................ G08C 17/02
310/36
6,255,799 B1    7/2001 Le et al.
(Continued)

FOREIGN PATENT DOCUMENTS

CN    201892991 U    7/2011
CN    202742999 U    2/2013
(Continued)

*Primary Examiner* — Brian Wilson
(74) *Attorney, Agent, or Firm* — Boyle Fredrickson, S.C.

(57) ABSTRACT

A communication device proposed by the invention comprises, in a modularly assembled design, a first module for generating a mechanical rotary motion, the rotational energy of which is converted into electrical energy by a second module, namely a converter module. A third module is a transmitter module which is supplied with and driven by energy from the converter module.

20 Claims, 3 Drawing Sheets

(51) Int. Cl.
*H02K 1/27* (2006.01)
*H02K 7/18* (2006.01)
*H02K 11/30* (2016.01)
*H02K 7/02* (2006.01)

(52) U.S. Cl.
CPC ............ *H02K 11/001* (2013.01); *H02K 11/30* (2016.01); *H02K 7/025* (2013.01)

(58) Field of Classification Search
USPC .................................................... 310/156.01
See application file for complete search history.

(56) References Cited

U.S. PATENT DOCUMENTS

| | | | |
|---|---|---|---|
| 7,222,984 B2* | 5/2007 | Lee | F21L 13/06 |
| | | | 320/123 |
| 8,570,171 B2 | 10/2013 | Hannah et al. | |
| 8,676,261 B2 | 3/2014 | Hermansson et al. | |
| 2002/0042292 A1* | 4/2002 | Hama | H02K 7/1853 |
| | | | 455/572 |
| 2002/0153419 A1 | 10/2002 | Hall | |
| 2003/0050010 A1* | 3/2003 | Fallenstein | H04B 5/02 |
| | | | 455/41.1 |
| 2004/0266480 A1* | 12/2004 | Hjelt | G06F 1/1632 |
| | | | 455/558 |
| 2005/0194852 A1* | 9/2005 | Liao | B65H 75/4434 |
| | | | 310/99 |
| 2006/0249320 A1* | 11/2006 | Carter | A47F 10/04 |
| | | | 180/65.51 |
| 2007/0057593 A1* | 3/2007 | Ito | H02K 7/1823 |
| | | | 310/216.066 |
| 2007/0131756 A1* | 6/2007 | Hall | G05B 19/00 |
| | | | 235/375 |
| 2009/0051317 A1* | 2/2009 | Fridhendler | H02J 7/32 |
| | | | 320/114 |
| 2009/0085530 A1 | 4/2009 | Matsubara | |
| 2012/0206295 A1 | 6/2012 | Wan | |
| 2013/0181468 A1 | 7/2013 | David | |

FOREIGN PATENT DOCUMENTS

| | | |
|---|---|---|
| DE | 247 955 A | 8/1911 |
| DE | 29 721 274 U1 | 2/1998 |
| DE | 100 46 593 A1 | 4/2002 |
| DE | 10 2009 041 023 A1 | 3/2011 |
| JP | 47-022609 A | 7/1972 |
| JP | H10190793 A | 7/1998 |
| JP | 2000-272312 A | 3/2000 |
| JP | 2002-84726 A | 3/2002 |
| JP | 2005-242494 A | 9/2005 |
| JP | 2011-208761 A | 10/2011 |
| JP | 2011-228816 A | 11/2011 |
| RU | 2280595 C1 | 7/2006 |
| WO | 2003 005533 A1 | 1/2003 |
| WO | 2003 005534 A2 | 1/2003 |
| WO | 2010/032234 A1 | 3/2010 |

* cited by examiner

COMMUNICATION DEVICE

Devices for the wireless transmission of signals are known, which obtain the energy required to operate the transmission from the environment of the transmitting device. Such devices are also referred to in speech as energy harvesters.

An example of such devices is a remote-controlled switch which generates a signal by mechanically dressing a button, which signal is transmitted wirelessly to a receiver in order then to turn an electrical device on or off.

The energy harvesters are also used to supply with power transmitters which wirelessly transmit measured values which are acquired by means of sensors.

An electrodynamic energy converter which can be used for this purpose is already known and comprises an oscillator with permanent magnets which is spring-mounted in a housing and moves opposite a coil. Said energy converter obtains its mechanical energy from oscillations (DE 10 2009 041 023 A1).

Furthermore, a communication device for mounting on a mobile device is known, which transmits measured data using a transmitter. The arrangement contains an energy store in the form of a battery. An energy converter having a wind turbine and a generator is used to charge the battery (DE 100 46 593 A1).

The problem addressed by the invention is to provide a wirelessly operating communication device which can be adapted with low effort to a wide variety of application cases and environments.

In order to solve said problem, the invention proposes a communication device having the features stated in claim 1. Developments of the invention are the subject matter of the dependent claims.

Therefore, according to the invention, a communication device of this type is constructed from at least three components which are modularly assembled. A first module converts kinetic energy into electrical energy and is referred to as converter module. A second module is an energy management module which, for example, stores, transforms and/or converts the electrical energy provided by the converter module in order to be able to provide electrical energy according to predefined, boundary conditions. A third module is a transmitter module which uses, the electrical energy for its own operation and transmits a communication signal, for example a measured-value signal.

Owing to the modular construction from three components, which may each be individually exchanged, it is possible to select, depending on the application case, a module which is specifically suitable for said application case and to use it in the communication device.

In a development of the invention, a motion module is provided as fourth module, which is connected to the converter module and mechanically generates a motion, in particular a rotary motion.

In specific application cases in which the motion is already present in a suitable form, the communication device with the converter module can directly tap the kinetic energy, with the result that the motion module is not necessary.

Provision is therefore made, in a development, for the possibility that the modules of the communication device can be individually exchanged for modules with other characteristics, preferably with identical or compatible installation sizes, however.

In a development, provision may be made, in the case of the communication device proposed according to the invention, for at least one module, preferably a mechanically self-contained module, to be selected from a multiplicity of modules having identical functionality and identical or compatible installation sizes.

According to the invention, provision may be made for at least one module to be implemented as mechanically separate component which is designed such that it may be mechanically and functionally coupled to the assigned adjacent module.

Depending on the components used, in a development according to the invention, provision may be made for the energy management module or the transmitter module to have a power matching unit. Said power matching unit is intended to be used to match the electrical energy supplied by the energy converter to the requirements of the electronics of the transmitter module and, optionally, also to the requirements of an active sensor.

Communication devices of the type in question here may be used as transmitters for measured values. If the value to be measured does not directly generate the rotary motion, it is therefore possible in a development for the transmitter module to have a connection possibility for a measuring sensor. It then makes sense for the power matching unit to be responsible for said sensor, too, if it is a sensor which also requires electric power to operate.

In another configuration of the invention, the device for mechanically generating the rotary motion may have a spring-loaded pushbutton the spring-loading of which is used to constantly set the pushbutton in a starting position. Using such a pushbutton, it is possible to check, for example, changes in the state of devices, for example the opening or closing of a flap.

In a development, the pushbutton can act on a crank drive in order to generate the rotary motion.

Another possibility for generating the rotary motion in the case of a linear actuation may be the use of a toothed rack.

Yet another possibility for generating a rotary motion may, of course, also be the use of a turbine which is acted on by a flow, for example a flow of air or a flow of water.

In a development, the device for generating a rotary movement can also have a transmission with a gear transmission or a gear reduction.

In particular, in the case of a pushbutton for generating the rotary motion, provision may be made for said device to have a freewheel with a non-reverse ratchet, so that a longer-lasting rotary motion can be generated by actuating the pushbutton multiple times.

In another development of the invention, provision may be made for the converter module to have a rotor with at least one permanent magnet and a stator separated from the rotor by an air gap and having at least one coil.

The electric power supplied by the converter module, may be changed within wide limits because of the number and design of the permanent magnets and the number and design of the coils.

By way of example, the rotor may have alternately polarized permanent magnets and the number and size of the coils of the stator may be identical to the number and size of the permanent magnets.

In a development of the invention, the at least one coil may be accommodated on a printed circuit board. The printed circuit board may be provided with a plug-in position for the energy management module and/or for the transmitter module.

In another configuration of the invention, provision may be made for the component which is mechanically set into rotary motion to be the rotor of the converter module.

In a development of the invention, the energy management module has a printed circuit board on which the converter module is arranged and which has a plug-in position for the transmitter module.

According to the invention, a communication device, as has been described in this application, may be used as signal generator. Hence, the actuation, for example of the pushbutton, provides the signal which is to be wirelessly transmitted. In addition, in the case of the rotary motion being generated by a turbine or a wind turbine, the rotation itself may be the signal, for example if the presence of a flow movement is to be interrogated.

According to the invention, a communication device, as has been described in this application, may be used to transmit measured sensor values. In this case, the rotary motion, which is mechanically generated, is used only for power supply to the transmitter module and optionally the sensor.

The invention likewise proposes a device designed as a module for mechanically generating a rotary motion for a communication device.

The invention likewise proposes a converter module for a communication device, which contains a rotor with at least one permanent magnet and a stator separated from the rotor by an air gap and having at least one coil.

The invention also proposes an energy supply module for a communication device, which contains a device designed as motion module for mechanically generating a rotary motion and a converter module for converting the rotational energy of the rotary motion into electrical energy.

Owing to the modular construction and the converter module, proposed by the invention, which enables high energy densities, the communication device has many and varied areas of application.

Further features, details and advantages of the invention emerge from the claims and the abstract, the wording of both of which is incorporated by reference into the description, from the following description of preferred embodiments of the invention and with reference to the drawing. Individual features of the various illustrated embodiments may be combined with one another in any way without going beyond the scope of the invention. In the figures:

FIG. 1 schematically shows a device for generating a rotary motion using a pushbutton;

Figure 1:
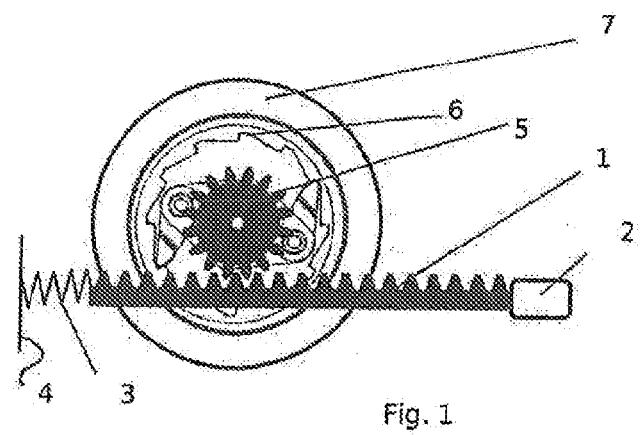
Figure 2:
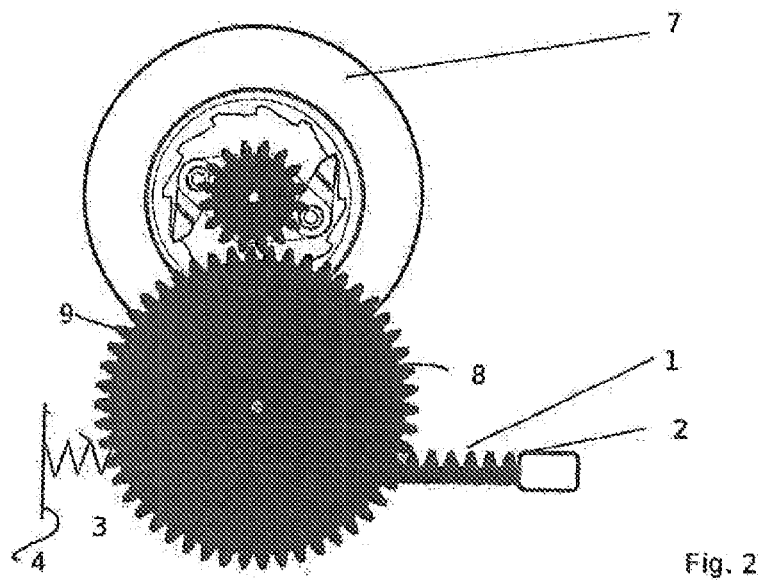
FIG. 2 shows an illustration corresponding to FIG. 1 with a gear transmission.
Figure 3:
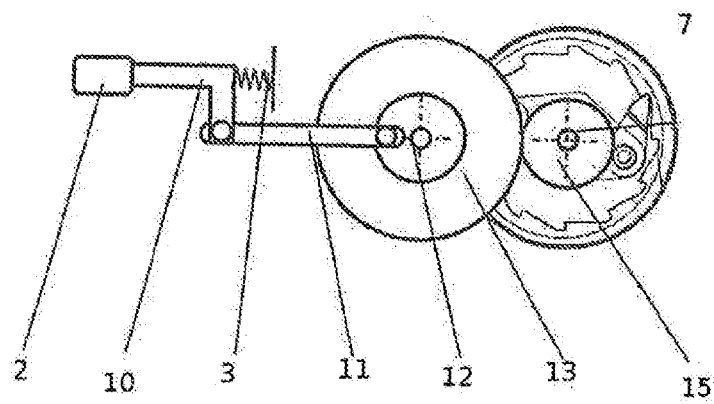
FIG. 3 shows, likewise schematically, a device for generating a rotary motion using a crank drive.
Figure 5:
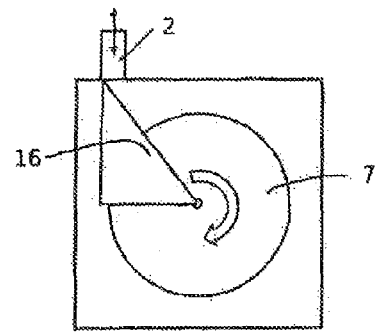
Figure 6:
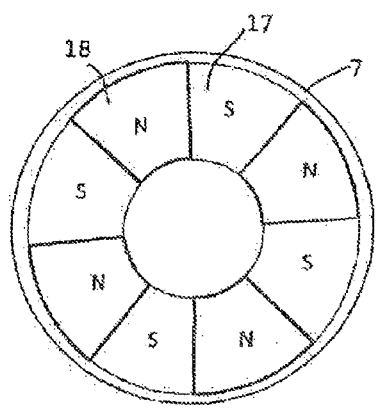
Figure 7:
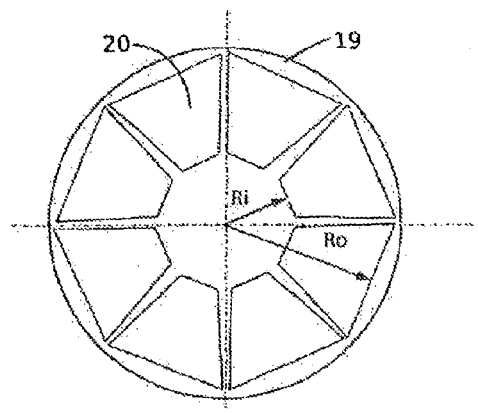
Figure 9:
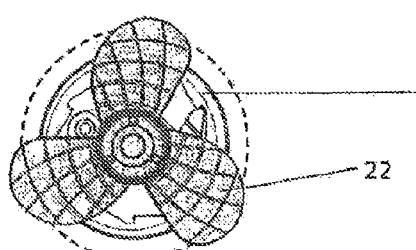
Figure 8:
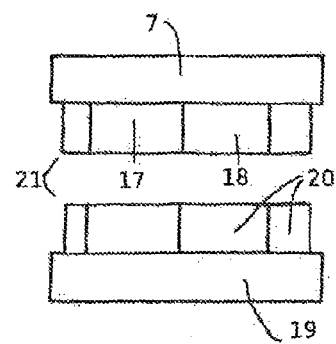
Figure 10:
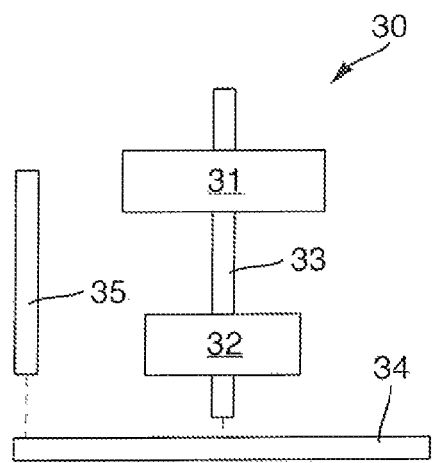
Figure 11:
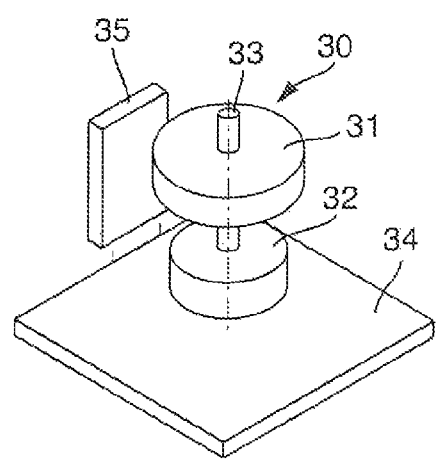
Figure 12:
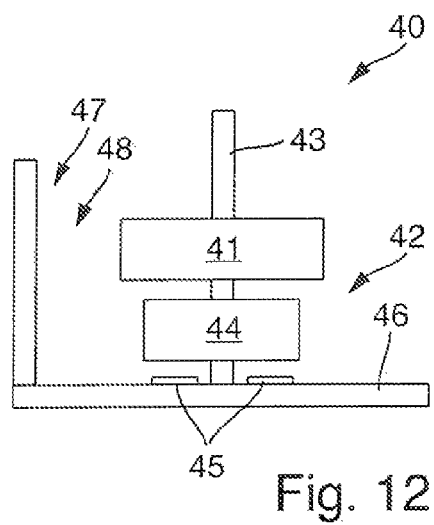
Figure 13:
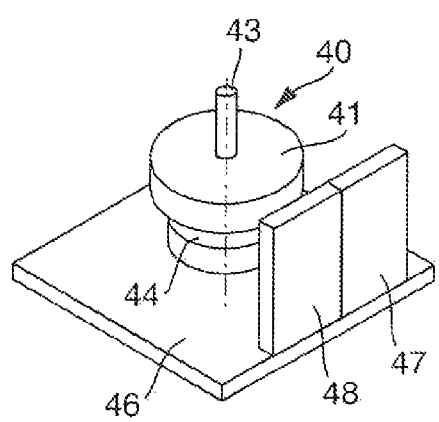

FIG. 5 schematically shows the construction of a communication device from the three modules;

FIG. 6 shows the end view of the rotor of a converter module of the communication device according to the invention;

FIG. 7 shows the end view the stator of the converter module;

FIG. 8 shows a simplified side view of the converter module of the communication device of the invention;

FIG. 9 shows an illustration corresponding to FIGS. 1-3 of a module for generating a rotary motion;

FIG. 10 shows a schematic exploded illustration of communication device according to the invention according to another embodiment;

FIG. 11 shows a view of the communication device of FIG. 10 obliquely from above;

FIG. 12 shows a schematic side view of a communication device according to the invention according to another embodiment; and FIG. 13 shows the communication device of figure obliquely from above.

FIG. 1 schematically describes the device for generating a rotary motion. The device contains a toothed rack 1 which is displaceably mounted in the module. The toothed rack 1 has a pushbutton 2 at its free end. It is moved into the illustrated position by a compression spring 3 which is supported against a housing wall 4. The toothed rack 1 is in engagement with its row of teeth with a toothed wheel 5. The toothed wheel 5 is connected to a disk 7 via an indicated freewheel 6. When the toothed rack 1 is displaced using the pushbutton 2, to the left in FIG. 1, the disk 7 is set into rotation via the toothed wheel 5. If the pushbutton 2 is released, the toothed rack 1 returns to the illustrated position. In this case, the disk 7 is decoupled from the toothed rack 2 by means of the freewheel. In this way, a longer-lasting rotary motion of the disk 7 can be generated by pushing multiple times.

In the embodiment illustrated in FIG. 2, the toothed rack 1 is in engagement with a toothed wheel 8 which is connected in a rotationally fixed manner to a larger toothed wheel 9. Said larger toothed wheel 9 is then in engagement with the toothed wheel 5 of the previous embodiment. Owing to the intermediate connection of the two toothed wheels 8, 9 a gear transmission is formed, with the result that the disk 7 is set into faster rotation with the same travel of the toothed rack 1.

In the embodiment illustrated in FIG. 3, a pushbutton 2 is again provided, which is displaceably guided within the module, and is set into a starting position by means of a compression spring 3. The angled end of the rod 10 which has the pushbutton 2 is connected to a wheel 12 via a connection rod 11, wherein the connection rod 11 is hinged eccentrically on the wheel 12. The wheel 12 is connected to a larger wheel 13 in a rotationally fixed manner, the circumference of said larger wheel being in engagement with a wheel 15 corresponding to the toothed wheel 5. In the illustrated example, there is a frictional engagement between the wheels 13 and 15. Apart from that, the rotation of the wheel 15 leads in turn to a rotation of the disk 7 via a freewheel. The embodiment illustrated in FIG. 3 therefore represents a crank drive for the disk 7.

Figure 4:
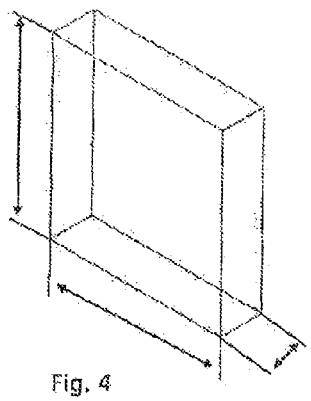
FIG. 4 shows the geometric shape of a communication device.

FIG. 4 schematically shows the size and the geometric shape of the communication device according to an exemplary embodiment of the invention. The communication device, which consists of the three parts, is to be housed in a cuboid as indicated in FIG. 4. The thickness of the cuboid is to be in the range from approximately 10-20 mm, while the edge length of the two other dimensions is to be approximately in the region of 50 mm.

FIG. 5 then shows a side view of such a communication device. The pushbutton 2 projects from a side of the cuboid. The travel of the button is approximately 2-10 mm. The button 2 sets the disk 7 into rotation via mechanics 16.

FIG. 6 then shows an end view of a part of the converter module, that is to say the module which converts the rotary motion of the disk 7 generated by the first module into electrical energy. This is the rotor in FIG. 6. The disk 7 forms the yoke of the rotor of the converter module. It consists of magnetically soft material. Permanent magnets 17, 18 are fastened to the yoke, the poles of which permanent magnets are oriented in an alternately opposing manner. In the illustrated example, there are eight permanent magnets. They have a circular-section shape in the plan view of FIG. 6.

The converter module contains a stator which cooperates with the rotor of FIG. 6 and is illustrated in an end view in FIG. 7. The stator contains eight coils 20 on a yoke 19 composed of magnetically soft material, which are in each case wound around a core composed of magnetic material. The number and size of the coils 20 corresponds to the number and size of the permanent magnets 17, 18 which are accommodated on the stator 7.

FIG. 8 shows a side view of the arrangement composed of the rotor from FIG. 6 and the stator from FIG. 7. The sides visible in FIG. 6 and FIG. 7 are opposite one another, and an air gap 21 is formed between the two parts.

The voltage supplied by the converter module depends on the rotational speed, the number of permanent magnets and coils, the number of windings on the coils, the material used, the size of the air gap and, of course, the overall size of the arrangement.

FIG. 9 shows another example, for the generation of the rotary motion. In this case, a wind turbine 22—a three-blade wind turbine in the illustrated example—is connected to the rotor 7. Said wind turbine 22 is used as an example of a turbine. Of course, other forms of turbines and wind turbines are possible. This type of generation of the rotary motion is suitable, for example, for environments in which wind always prevails.

However, an arrangement as illustrated in FIG. 9 can also be used to indicate the presence of a flow of air or a flow of liquid.

The illustration of FIG. 10 schematically shows a communication device 30 according to the invention, which has a motion module 31 and a converter module 32, wherein the motion module 31 and the converter module 32 are arranged on a common axle 33. A rotary motion around the axle 33 is generated by the motion module 31, which rotary motion is then converted into electrical energy by the converter module 32. The axle 33 is provided to be set on a printed circuit board of a power management module 34. In the illustration of FIG. 10, the axle 33 is illustrated in a manner lifted off the power management module 34 and a dashed line is intended to indicate the provided connection between axle 33 and power management module 34.

In the power management module 34, the electrical energy supplied by the converter module 32 is converted according to predefined boundary conditions. The electric voltage supplied by the converter module 32 is, for example, stepped up and regulated in the energy management module 34. An AC voltage is supplied by the converter module 32, which AC voltage is induced by means of a rotating rotor with permanent magnets and stationary coils opposite the rotating permanent magnets. Said AC voltage is firstly stepped up to a value of a few volts in the energy management module 34 by means of a transformer. Then, the voltage is rectified and regulated to a desired value by means of a DC-to-DC converter. The AC voltage supplied by the converter module 32 can be stepped up by a factor of 100, for example. A regulated DC voltage with a value of, for example, 1.8 volts or 3.3 volts is supplied as output voltage of the energy management module 34 and then provided to a transmitter module 35.

The transmitter module 35 can then transmit an item of information, for example a measured-value signal. The signal can then be transmitted, for example, to a central station or to a suitable controller, for example a motor controller. The transmitter module 35 is provided to be plugged into a plug-in position—not illustrated in FIG. 10—on the printed circuit board of the energy management module 34. This is indicated by means of a dashed line between the transmitter module 35 and the energy management module 34 in FIG. 10.

FIG. 11 shows a view of the communication device 30 of FIG. 10 obliquely from above. The compact construction of the communication device 30 can be seen. A significant advantage of the modular construction is that the individual modules 31, 31, 34 and 35 can be exchanged not only for modules with other properties but, above all, also that modules which are customary on the market can be used. By way of example, a market-ready system can be used as energy management module 34, for example MSP430 from Texas Instruments or LTC31xx or LTC35XX from Linear Technology. In addition, systems which are available on the market may be used as transmitter module, for example, Semtech SX1230 or transmitter modules ZIGBEE. The transmitter modules can transmit, for example, signals at a frequency of 315 MHz, 434 MHz, 868 MHz or 915 MHz. The range of said systems is typically up to 100 m. The transmitted signal can be a message about the kinetic energy generated at the motion module 31, for example if the motion module 31 has a turbine and a message, about a flow speed is to be seat. However, a sensor may also be connected to the transmitter module 35 or to the energy as management module 34, the signal of which sensor is then transmitted by means of the transmitter module 35.

The illustration of FIG. 12 shows a schematic side view of another communication device 40 according to the invention. A motion module 41 and a converter module 42 are arranged on a common axle 43. The motion module 41 generates rotational energy which is then converted into electrical energy by the converter module 42. The converter module 42 has a rotor 44 in the illustrated embodiment, which rotor rotates about the axle 43 and has a plurality of permanent magnets. An electric voltage is induced in coils 45 by the rotation of the rotor 44. The coils 45 are provided on a printed circuit beard 46 and are, for example, printed on said printed circuit board 46. The voltage induced in the coils 45 is then transferred via conductor tracks on the printed circuit board 46 to a power or energy management module 47. The energy management module 47 then provides a suitable. electrical energy supply to a transmitter module 48, taking account of predefined boundary conditions.

In the illustration of FIG. 13, it can be seen that the energy management module 47 and the transmitter module 45 are plugged into plug-in connectors (not illustrated) on the printed circuit board 46. As a result of this, the energy management module 47 can be simply plugged on and additional connecting wires are not necessary since the transmission of electrical energy is done by means of conductor tracks on the printed circuit board 46. The transmitter module 48 is plugged on in the same manner, wherein the transmitter module 48 can either be plugged onto the energy management module 47 or likewise, into a suitable plug-in connector on the printed circuit board 46, wherein the energy management module 47 then provides the energy necessary for the operation of the transmitter module 48 via a plug-in connector on the printed circuit board 46. As has been mentioned, not only are the coils 45 printed onto the printed circuit board 46 but also the entire wiring for said coils 45. The construction of the communication device 40 according to the invention is significantly simplified as a result of this and, if necessary, individual modules can easily be exchanged for other modules with different properties.

The invention claimed is:

1. A communication device, comprising
a converter module for converting kinetic energy into electrical energy,
an energy management module, connected to the converter module, for providing electrical energy according to predefined boundary conditions proceeding from the electrical energy provided by the converter module,
a transmitter module for transmitting information, wherein the transmitter module is powered by the electrical energy provided by the energy management module, and
a printed circuit board,
the printed circuit board having mounted thereon
a plug-in position for receiving the energy management module
a plug-in position for receiving the transmitter module
a converter module mount, wherein the converter module is affixed to the converter module mount and
conductor tracks for receiving the electrical energy of the converter module and connecting to the plug-in position of the energy management module.

2. The communication device as claimed in claim 1, wherein a device designed as a motion module for mechanically generating motion is provided, wherein the motion module is connected to the converter module and the converter module converts a kinetic energy of the motion-generated in the motion module into the electrical energy.

3. The communication device as claimed in claim 1, wherein one or more of the modules are individually exchangeable for modules with other characteristics.

4. The communication device as claimed in claim 1, wherein the energy management module has a power matching unit.

5. The communication device as claimed in claim 1, wherein the transmitter module has a connection for a sensor.

6. The communication device as claimed in claim 1, having a spring-loaded pushbutton for generating the kinetic energy from rotary motion.

7. The communication device as claimed in claim 6, having a crank drive connected to the pushbutton.

8. The communication device as claimed in claim 6, having a toothed rack connected to the pushbutton.

9. The communication device as claimed in claim 6, having a gear transmission in the converter module for generating the rotary motion.

10. The communication device as claimed in claim 1, having a turbine acted on by a flow for generating the kinetic energy from rotary motion.

11. The communication device as claimed in claim 1, having a non-reverse ratchet and a freewheel.

12. The communication device as claimed in claim 1, wherein the converter module has a rotor with at least one permanent magnet and a stator separated from the rotor by an air gap and having at least one coil.

13. The communication device as claimed in claim 12, wherein the at least one coil is mounted on the printed circuit board.

14. The communication device as claimed in claim 13, wherein the conductor tracks are connected to the at least one coil mounted on the printed circuit board.

15. The communication device as claimed in claim 12, wherein rotary motion is generated by the rotor of the converter module.

16. The communication device as claimed in claim 1 wherein the communication device is a signal generator.

17. The communication device as claimed in claim 1 wherein the communication device transmits measured sensor values.

18. The communication device as claimed in claim 1, comprising
an energy supply module designed as a motion module for mechanically generating a motion.

19. The communication device as claimed in claim 1, wherein the converter module includes a rotor with at least one permanent magnet and a stator separated from the rotor by an air gap and having a plurality of coils.

20. The communication device as claimed in claim 1, wherein the converter module mount is an axle, the rotation of which provides the kinetic energy.

* * * * *